United States Patent [19]
Eller

[11] 4,114,747
[45] Sep. 19, 1978

[54] SWITCHING BEARING ASSEMBLY FOR A MOTOR-DRIVEN SPINDLE

[76] Inventor: Fritz Eller, Hellweg 36, 4300 Essen

[21] Appl. No.: 778,462

[22] Filed: Mar. 17, 1977

[30] Foreign Application Priority Data

Mar. 17, 1976 [DE] Fed. Rep. of Germany ....... 2611211

[51] Int. Cl.² ...................... F16D 71/00; F16D 63/00
[52] U.S. Cl. ...................... 192/150; 188/83;
  188/85; 192/141; 192/143; 200/47; 200/158
[58] Field of Search ...................... 192/141, 143, 150;
  188/83, 85; 200/47, 158

[56] References Cited

U.S. PATENT DOCUMENTS

| | | | |
|---|---|---|---|
| 643,286 | 2/1900 | Feiker | 188/85 X |
| 2,249,297 | 7/1941 | Muffett | 188/83 X |
| 3,369,087 | 2/1968 | Eller | 200/47 |
| 3,651,906 | 3/1972 | Slator | 188/83 X |
| 3,682,283 | 8/1972 | Sato | 192/150 |
| 3,957,144 | 5/1976 | Opyrchal | 188/83 X |

*Primary Examiner*—Allan D. Herrmann
*Attorney, Agent, or Firm*—Karl F. Ross

[57] ABSTRACT

A switching bearing assembly for a motor-driven spindle, e.g. a leadscrew adapted to drive a nut axially along the leadscrew, is provided with a bearing housing disposed between two fixed plates and biased centrally thereof by a plurality of compression springs. The housing is positioned to actuate switches which turn off the motor when the spindle bearing is overloaded, e.g. when the nut reaches the end of its travel or is otherwise impeded in its first axial movement. The housing is also provided with a spring-biased pin which bears upon an eccentric carried by the shaft to frictionally retard further rotation thereof once the motor has been turned off.

9 Claims, 3 Drawing Figures

SWITCHING BEARING ASSEMBLY FOR A MOTOR-DRIVEN SPINDLE

FIELD OF THE INVENTION

The present invention relates to a switch-bearing assembly for a motor-driven spindle, e.g. of a leadscrew or other worm, for example, for a conveyor worm, the leadscrew of a machine tool or the like, adapted to drive a nut or other member axially along the screw. More particularly, the invention relates to an improvement in such devices in which further rotation of the spindle is impeded when the motor has been turned off by the switches actuated by movement of the bearing upon overloading.

BACKGROUND OF THE INVENTION

In conveyor-screw drives, the drives for plasticizer-worm extruders and machine tools, it is common practice to provide a leadscrew or other screw-carrying spindle and to drive the latter with an electric motor. A member, e.g. a nut, is displaceable axially along the screw by the rotation thereof.

In order to prevent overloading of the system, it has been proposed (see German printed application — Auslegeschift DT-AS 11 98 159 corresponding to U.S. Pat. No. 3,369,087) to provide a bearing assembly for the spindle shaft which comprises a bearing housing and a pair of thrust-radial bearings, i.e. so-called shoulder bearings, acting in opposite directions on abutments provided on the shaft. The bearing housing, rather than being fixed, is permitted to shift axially between a pair of fixed plates against a plurality of compression springs. The bearing housing acts upon a pair of switches flanking this housing and actuated, depending upon the direction of rotation of the spindle, by the axial displacement of the housing when a reaction force is applied thereto because further movement of the nut is blocked or severely restricted. The switches are connected to the motor to deenergize the latter and thus prevent overloading of the device. The blockage of the nut can result from the latter reaching the end of its travel in one or the other direction, or because of some failure or other impediment in the travel of the nut.

While this system has been found to be highly effective in practice, it has the disadvantage that the reaction force described also results in some reverse rotation of the screw that can cause the housing to recede from the actuated switch and thereby bring about reenergization of the motor. As a result, the system is not turned off securely and reliably and vibration of chattering can ensue. This is obviously a drawback of the prior system described above.

OBJECTS OF THE INVENTION

It is the principal object of the present invention to provide a switch-bearing assembly which retains the advantages of the aforedescribed system but is free from the disadvantages thereof.

It is another object of the invention to provide a relatively simple and inexpensive switch-bearing assembly for the purposes described which can securely and reliably terminate operation of the motor when one of the switches of the assembly is activated.

Still another object of the invention is to provide a switch-bearing assembly of the aforedescribed type which is improved in that, upon deenergization of the motor, spindle rotation beyond a predetermined limit is no longer possible.

SUMMARY OF THE INVENTION

These objects and others which will become apparent hereinafter are attained, in accordance with the present invention, by providing the bearing housing with a compression spring which is perpendicular to the axis of the spindle, i.e. lies along a radius thereof, and biases a similarly oriented pressure pin radially against an eccentric body fixed to the spindle. The force of the compression spring is set so that, while the motor is energized, the rotation of the spindle is not impeded, the eccentric merely producing a radial back and forth movement of the pin perpendicular to the spindle or shaft. However, when the motor driving the spindle or shaft is deenergized, vibration and chattering is eliminated in that the pressure pin permits rotation of the spindle only until it reaches its shortest radial distance from the spindle axis, the subsequent force buildup upon the pin retarding and preventing further rotation. As a result, the spindle can rotate at most through one half of a revolution subsequent to deenergization of the motor.

The advantages obtained with the present invention will be immediately apparent in that it permits the switching bearing for a screw drive to completely terminate undesired spindle rotation upon deenergization of the motor. Furthermore, the system is extremely simple, has minimum wear and can be maintained or inspected with ease.

The eccentric, according to the invention, is a circular disk which has its axis offset from the axis of the shaft or spindle, i.e. a so-called round eccentric. Advantageously, the eccentric disk is disposed between a pair of shoulder-type ball bearings (i.e. combined axial and radial ball bearings) which are mounted upon the spindle and have their outer bases received in the bearing housing flanking the pressure pin. This affords a substantially symmetrical construction of the bearings and the bearing housings.

An especially advantageous friction relationship between the eccentric and the pressure pin can be obtained when, in accordance with a preferred embodiment of the invention, the end of the pressure pin engaging the eccentric and hence turned toward the spindle is rounded off with a hemispherical configuration.

A rounded configuration can also be provided, in accordance with another feature of the invention, when the end of the pressure pin engaging the eccentric is provided with a ball which is free to rotate in a socket provided at this end, more or less in the manner of the ball of a ball-point pen.

According to still another feature of the invention, the pin and the compression spring can be received in a member which is threaded into the bearing housing perpendicular to the axis of the shaft and which projects therefrom to form the actuating element for the switches of the switch-bearing assembly. In this case, the spring, pin and threaded member are accessible from the same side as the control switches, thereby facilitating maintenance, repair or replacement. Advantageously, the spring and the pin are affixed to the threaded member so that they are withdrawn with the latter when the threaded member is removed from the bearing assembly. Here again maintenance and replacement is facilitated.

BRIEF DESCRIPTION OF THE DRAWING

The above and other objects, features and advantages of the present invention will become more readily apparent from the following description, reference being made to the accompanying drawing in which.

SPECIFIC DESCRIPTION

The switch-bearing assembly according to the present invention can, apart from the construction of the pressure pin and the eccentric according to the invention, have the construction in U.S. Pat. No. 3,369,087 mentioned previously. However, it is preferred to provide the pin housing as the actuating member for the switches in the manner described below and hence the bearing assembly can be modified to this extent.

Figure 1:
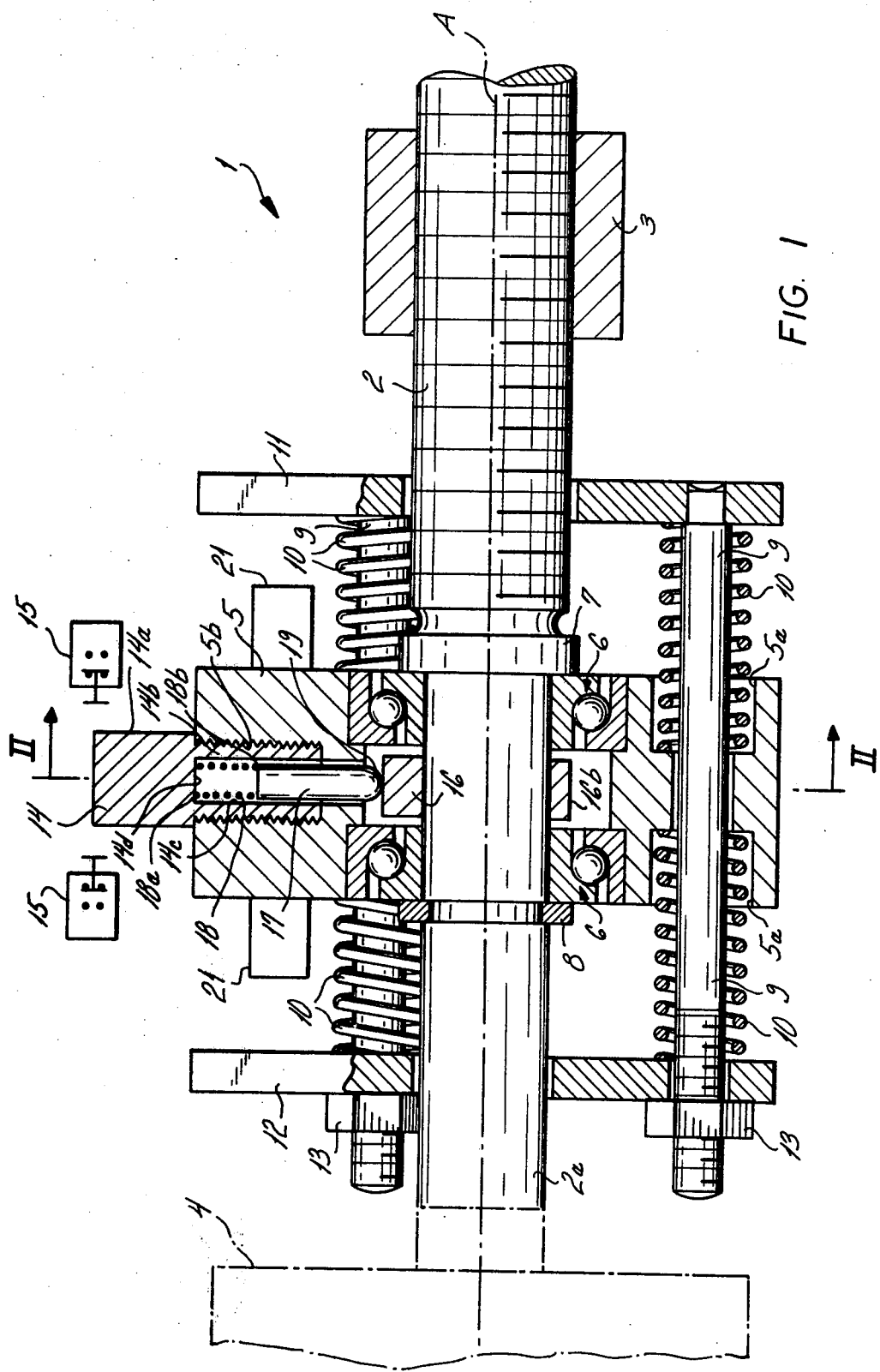
FIG. 1 is an axial cross-sectional view, partly in diagrammatic form, of a switch-bearing assembly according to the present invention.
Figure 2:
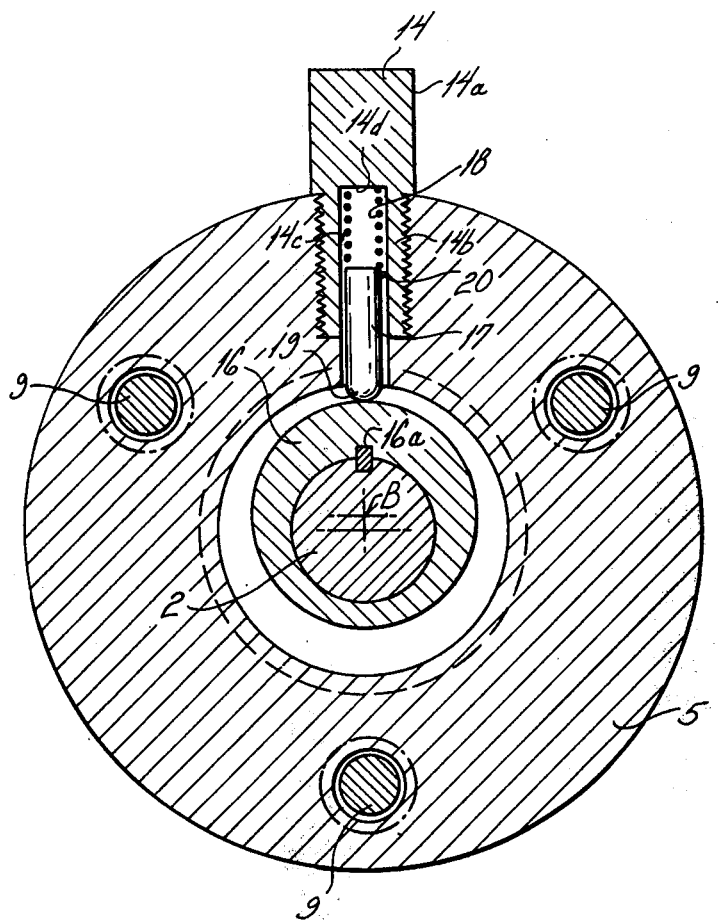
FIG. 2 is a cross-sectional view taken along the line II—II of FIG. 1.

In FIGS. 1 and 2 I have shown a switch-drive assembly 1 which comprises a threaded spindle 2 and a nut 3 axially displaceable along the spindle upon rotation thereof by an electric motor diagrammatically illustratd at 4, the motor being coupled to the shaft 2a of the spindle 2 by any conventional coupling, e.g. a spline arrangement permitting limited axial mobility of the spindle.

The bearing assembly comprises a bearing housing 5 provided with a pair of shoulder ball bearings (e.g. as described in the aforementioned U.S. Pat. No. 3,369,087), each of which is represented at 6 and has its inner races engaging fixed abutments on the shaft 2a. These abutments can be constituted by a shoulder 7 formed directly on the shaft 2a at its junction with the screw 2, and a split ring 8 which is received in a groove of the shaft 2a. The outer races of the bearings are fixed in the bearing housing 5.

The bearing housing 5 is guided on a plurality of fixed rods 9 which are, in turn, fixed in a pair of plates 11 and 12 mounted upon the machine housing so as to form fixed abutments for the bearing housing 5. Stops 21 can be provided on the bearing housing 5 to engage the plates 11 in extreme positions of the bearing housing and thereby prevent overloading of compression springs 10. Compression springs 10 are seated against the plates 12, surround and rods 9, and engage the bearing housing 5 to bias the same into a central position as illustrated in FIG. 1. The plates 11 and 12 flank the bearing housing 5.

It is advantageous to make the right pressure plate 11 rigid with the housing and to pass the rods 9 through openings in the plate 12 and hold the plate 12 against movement to the left by nuts 13. This permits adjustment of the prestress of the springs 10. In other words, if the nuts 13 are turned more fully onto the rods 9 the springs 10 can be held under greater pressure against the bearing housing 20.

The helical compression springs 10 are also disposed on both sides of the bearing housing 5 and can be received in recesses open in opposite directions and formed in the latter. Two such recesses are shown at 5a in FIG. 1.

The abutments 21 can be disposed in angularly equispaced relationship symmetrically about the axis A of the device as, for example, shown in the aforementioned German Auslegeschrift.

The bearing housing 5 is provided with an acutating member 14 adapted, alternatively, to operate either of a pair of switches 15 connected in circuit with the motor 4 for deenergizing same upon engagement by the actuating member 14. The switches 15 can be fixed for any operation of the device but are preferably adjustable in the axial direction, e.g. on suitable rails.

Between the bearings 6, the shaft 2a of the spindle 2 is provided with an eccentric disk 16 of circular outer configuration, the axis of this disk being offset from the axis A. In FIG. 2, the disk axis has been represented at B. The eccentric disk 16 is keyed at 16a to the shaft 2a.

The actuating member 14 is provided with a head 14a having a threaded shank 14b which is threadedly received in a radial bore 5b of the bearing housing 5 at the side thereof at which the switches 15 are provided. The shank 14b, in turn, is provided with a radially extending bore 14c receiving a compression coil spring 18 and a pressure pin 20, the latter having a rounded (hemispherical) end 19 engaging the periphery 16b of the eccentric disk 16. The spring 18 is seated against the end 14d of the bore 14c and is welded thereto at 18a. At its other end, the spring 18 is welded at 18b to the pin 17.

Thus the actuating member 14 can be threaded into the bearing housing 5 perpendicularly to the axis A to bring the pin 17 to bear against the periphery 16b of the eccentric with a prestress on the spring 18 determined by the degree to which the member 14 has been screwed into the housing 5.

In operation, when the member 14 operates one of the switches 15 to deenergize the motor 4, rotation of the disk 16 is permitted until the end 19 of the pin 17 reaches its closest distance from the shaft 2a. Any further rotation would tend to compress the spring 18 and thus is resisted by progressively increasing friction force.

Figure 3:
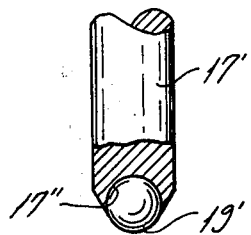
FIG. 3 is a detail view, partly broken away, of another embodiment of the pressure pin according to the invention.

As also can be seen from FIG. 3, the rounded end of the pin, e.g. the pin 17', can be formed by a ball 19' received in a socket 17" extending beyond the diametrical plane of this ball so as to retain the ball in the socket in the manner of the ball-point pen. Thus, when the pin 17' is withdrawn, the ball is carried with it. However, the ball is free to rotate within the socket. For inspection or replacement of the parts of the pressure pin on the spring etc., it is merely necessary to unscrew member 14 from the bearing housing 5.

The motor 4 drives the leadscrew 2 in the usual manner to advance the nut 3 which represents the element to be driven axially by this screw. When this nut 3 reaches the end of its travel, further rotation of the leadscrew 2 increases an axial displacement of the bearing housing 5 in one or the other direction to compress the springs 10 in this direction against the plate 11 or 12. The actuating member 14, as a result of this displacement of the bearing housing 5, operates the switch 15 on the side to which the bearing housing 5 moves and de-energizes the motor. An excessive displacement is prevented by the bumper 21 on this side, this bumper or stop engaging the plate 11 or the plate 12 depending upon the direction in which the bearing housing 6 is displaced. Usually, however, the advance of the bearing housing is terminated before the stop 21 comes into play.

When the motor 4 is de-energized, rotation of the leadscrew 2, which entrains the eccentric disk 16, normally continues until the disk has displaced the pin 17 against the force of spring 18 to the point that this spring is compressed enough to apply a force to the pin 17 so that friction between the surface 19 or the ball 19' and the disk is increased to the point that further rotation is resisted sufficiently to halt the shaft. Naturally, when the motor 4 is reversed, the nut 3 is displaced in the opposite direction and the bearing block 5 is urged by the springs 10 into its central position shown. The halting of nut 3 in its movement in the opposite direction results in an axial displacement of the bearing body 5 in the opposite direction and a repetition of the process just described.

I claim:

1. A switch-bearing assembly for a motor-driven spindle having a screw operatively connected to a driven member for axially displacing same upon rotation of the screw, said assembly comprising a bearing housing surrounding said spindle and provided with a pair of shoulder ball bearings axially engaging said spindle in opposite directions;

a pair of axially fixed pressure plates flanking said housing and spaced therefrom;

respective guide rods bridging said pressure plates;

respective compression springs surrounding said guide rods and seated against each of said pressure plates while bearing upon said housing to yieldably resist axial displacement thereof relative to said pressure plates;

a pair of switches connectable for deenergizing said motor and engageable upon axial displacement of said housing in opposite directions;

an eccentric carried by said spindle and rotatable therewith;

a pressure pin radially displaceable in said housing and engaging said eccentric; and a compression spring bearing upon said pin for urging same against said eccentric to resist rotation of said spindle relative to said housing beyond a predetermined extent upon deenergization of said motor.

2. The assembly defined in claim 1 wherein said eccentric is disposed between said bearings on said spindle.

3. The assembly defined in claim 2 wherein said pin has a rounded end engaging said eccentric.

4. The assembly defined in claim 3 wherein said rounded end is formed unitarily on said pin.

5. The assembly defined in claim 3 wherein said rounded end is a ball received in a socket formed in said pin.

6. The assembly defined in claim 3, further comprising a switch-actuating member threaded into said housing and carrying said pin and the compression spring bearing thereon.

7. The assembly defined in claim 6, wherein said actuating member is provided with a head and a threaded shank having a radially extending bore, said housing being formed with a radially extending bore on the same side of said housing as said switches are provided, said head being engageable with said switches alternatively, said shank being threaded into said radial bore of said housing.

8. The assembly defined in claim 7, wherein said compression spring bearing upon said pin is affixed to said pin and to said member so as to be withdrawn with said pin upon unscrewing of said member from said housing.

9. The assembly defined in claim 8 wherein said eccentric is a circular disk keyed to said spindle and having its axis offset from the axis of said spindle.

* * * * *